Figure 1:
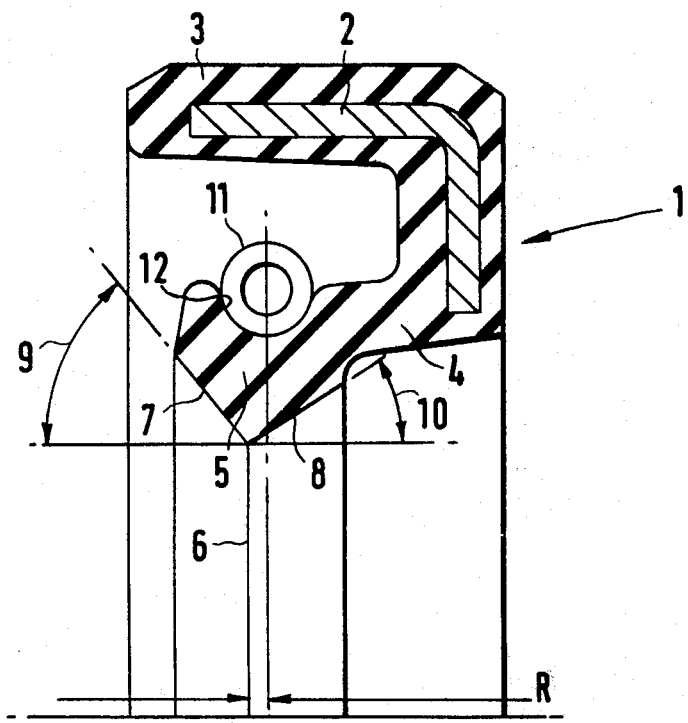

United States Patent [19]
Johnston et al.

[11] 3,921,990
[45] Nov. 25, 1975

[54] SHAFT SEALS

[75] Inventors: David Ernest Johnston, Newcastle-upon-Tyne; Peter John Russell, Northumberland, both of England

[73] Assignee: George Angus & Company Limited, England

[22] Filed: June 18, 1973

[21] Appl. No.: 370,730

[52] U.S. Cl. ............................ 277/182; 277/153
[51] Int. Cl.² ........................................ F16J 15/00
[58] Field of Search .......... 277/237, 153, 182, 183

[56] References Cited
UNITED STATES PATENTS

| | | | |
|---|---|---|---|
| 2,819,106 | 1/1958 | Voorhees | 277/182 |
| 3,127,185 | 3/1964 | Evans | 277/153 X |
| 3,392,226 | 7/1968 | McKinven, Jr. | 277/153 X |

*Primary Examiner*—Samuel B. Rothberg
*Attorney, Agent, or Firm*—Larson, Taylor and Hinds

[57] ABSTRACT

A rotary shaft lip seal comprises a moulded ring of elastomeric material with a specified Young's modulus and a concave moulded face which meets the sealing edge at a specified tangent angle so as to achieve a well defined sharp divergence between the moulded face and the sealed surface.

4 Claims, 4 Drawing Figures

SHAFT SEALS

This invention relates to shaft seals and in particular rotary shaft lip seals, known also as oil seals, which basically are moulded rubber or like elastomeric rings used to seal annular spaces around shafts, and like machine parts, to retain oil and exclude dust and dirt.

Such seals are widely used in industry, especially for automobiles, and well-accepted terminology for them will be used in this specification.

The invention is concerned with the shape of the moulded face of a seal in the immediate vicinity of the sealing edge and with providing a seal wear land, also known as the sealing band or contact band, which will be sharply defined at the back, i.e., at the junction with the moulded face on the air side.

Investigation of the performance of seals has shown that the occurance of leakage is associated with indefinite or gradual divergence of the moulded face from the sealed surface and particularly, especially with relatively soft elastomers such as silicone rubbers, bulging of the moulded face so that it forms with the sealed surface a gradually increasing radial gap of somewhat cusp-shaped cross-section.

Without becoming involved in the theory of fluid sealing, it is reasonable to observe that such a gradually increasing radial gap is not conducive to the maintenance of a stable meniscus of an oil film between the seal and the sealed surface such as is believed to be essential for an effective lip seal.

The present invention provides a seal which will have a well-defined sharp divergence of the moulded face from the sealed surface, this being achieved by suitable flexibility of the elastomeric material of the seal, an appropriate shaft angle, i.e., the angle between the moulded face and the sealed surface, and a specified configuration of the moulded face.

According to the invention, a rotary shaft lip seal, comprising a moulded ring of elastomeric material with a sealing lip having a sealing edge defined by a moulded face on the air side of the seal, is characterised by the features that the elastomeric material of the ring has a Young's modulus of between 3.5 and 8.5 MN/m$^2$ and the moulded face is concave so as to meet the sealing edge at a tangent angle of between 50° and 80° inclusive.

Conveniently the concavity of the moulded face is of circular curvature, so that the moulded face is a ring segment of a spherical surface, this facilitating machining of the centre pin of a moulding die by simple turning.

For the majority of seals, the required radius is quite small, e.g., between 2 mm and 7 mm. This covers seals for shaft diameters up to 200 mm, although the radius is determined as a function of an axial dimension of the seal, known as lip height (L), rather than shaft diameter.

The concavity need not be circular, other second degree curves to give corresponding concavity being usable.

Figure 2:
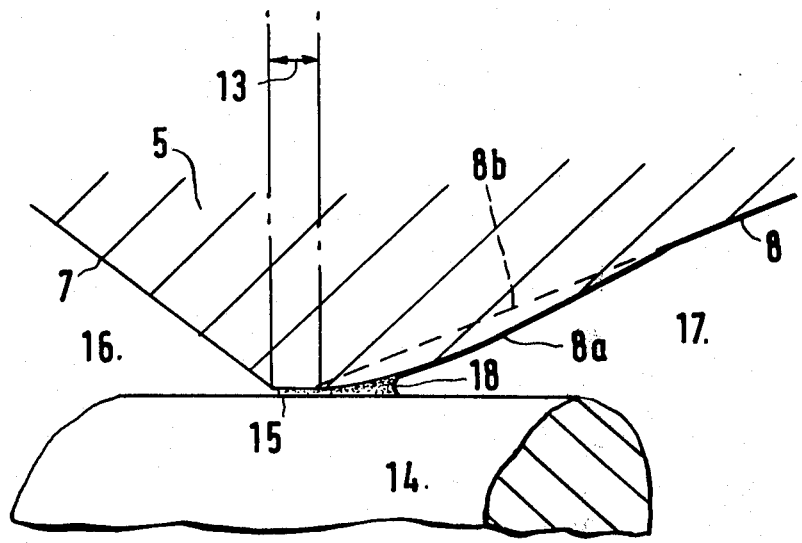
Figure 3:
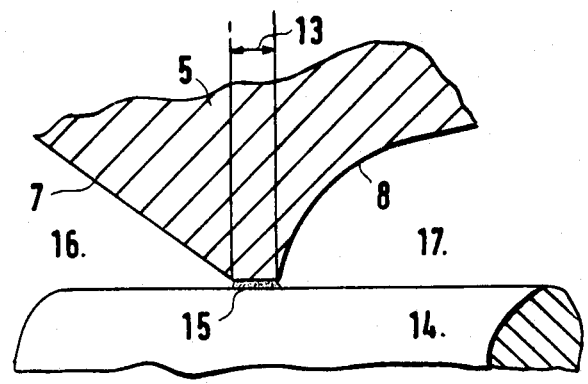
Figure 4:
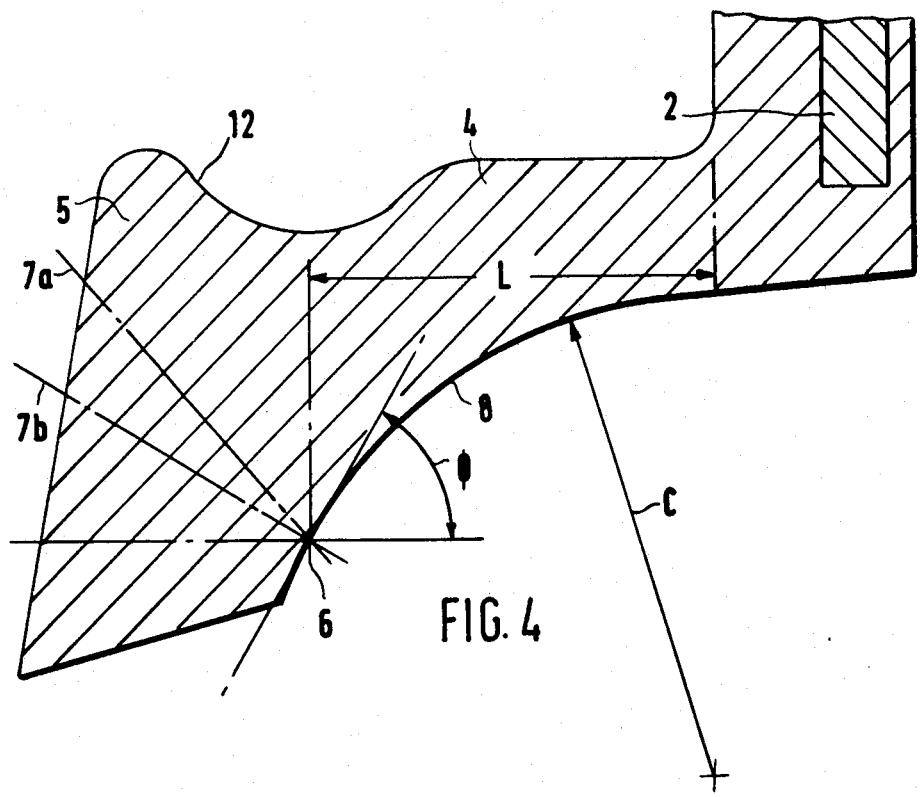

The invention will now be described with reference, by way of example, to the accompanying drawings, in which:

FIG. 1 is a diagrammatic axial half-section of a typical rotary shaft lip seal, to illustrate the relevant terminology, FIG. 2 is an exaggerated fragmentary axial cross-section of a seal lip to show the defect of bulging of the moulded face spoiling sharp definition of the back of the sealing wear land, FIG. 3 is an enlarged fragmentary axial cross-section of the lip of a seal in accordance with the invention, to illustrate the principle, and FIG. 4 is an axial cross-section of a lip, as moulded and before trimming, of a seal in accordance with the invention.

A seal as shown by FIG. 1 comprises a moulded rubber ring 1 stiffened by a metal insert 2 so that it can be moulded as an interference fit in a shaft housing against which an external peripheral rubber cover 3 makes a static seal.

To seal peripherally with a wiping contact around the shaft, the seal has a flexible lip comprising a leg 4 and a head 5 on which a sealing edge 6 is formed by the junction between a front or inner frusto-conical surface 7, called the trim face by derivation from its formation by trimming of the moulded ring 1, and a back or outer frusto-conical surface 8, called the moulded face because, in contrast to the trim face 7, it is always formed in the moulding of the ring 1. It should here be mentioned that the face 7 need not be formed by trimming but can be moulded, at least in part, to produce a so-called "moulded-edge" seal. The angle 9 is the trim angle and the angle 10 the moulded angle, also known as the shaft angle.

In use, the face 7 is directed towards the sealed fluid, the corresponding front of the seal being also known as the oil side, and the face 8 is directed away from the sealed fluid, the corresponding back of the seal being also known as the air side.

To load the sealing edge resiliently on to the shaft, the sealing head is embraced by a garter spring 11, seated in a groove 12, and the axial distance between the spring groove centre line and the sealing edge is known as the R value, positive if the spring groove is behind the sealing edge, as in the example shown, or negative if the spring groove is in front of the sealing edge.

The sealing edge 6 initially is a fine edge, as trimmed or moulded, but in use the edge wears or beds in and broadens, if only slightly, to form a narrow cylindrical surface known as the seal near land, or sealing band or contact band, which is illustrated, on an exaggerated scale, in FIG. 2 as a cylindrical land 13 replacing the edge 6.

Between the land 13 and the shaft 14 ideally a stable oil film 15 should be maintained to prevent leakage from the oil side 16 to the air side 17 of the seal in its annular space around the shaft.

Depending upon the inside diameter interference, between the seal and shaft diameters, the softness of the rubber and the load of the garter spring 11, there is a tendency in some known lip seals for the frusto-conical moulded face 8 to bulge towards the shaft, as indicated at 8a, instead of retaining its moulded form, indicated by the broken line 8b.

When bulging occurs, there is increased likelihood of the seal leaking and it is possible that this is due to the oil film 15 becoming extended at the back into a progressively widening cusp-section resulting in axial instability in the meniscus, indicated as 18, which then breaks down with consequent leakage.

The principle of the present invention is illustrated by FIG. 3, in comparison with FIG. 2, and comprises the moulded face 8 being concave so that, even with deflection or deformation of the sealing head 5, the moulded face 8 will always sharply meet and maintain well defined the sealing wear land 13.

It must be emphasized that the discussion above, with reference to FIG. 2, of the possible effect of bulging of the frusto-conical moulded face 8 of some known lip seals is given not as a proven theory but only to assist appreciation of one possible improvement offered by the new feature of concave formation of the moulded face in accordance with the present invention.

It is however a face that a suitable concave formation of the moulded face ensures sharp or well-defined shaft contact and it is observable that this improves reliability of the seal.

The same feature of concave formation of the moulded face enables the leg 4 and sealing head 5 to be designed for flexure of the lip about the junction between the leg and the radial web of the moulded ring 1, or an equivalent locus of flexure in the case of a bonded lip seal in which the lip is bonded on to a radial flange of a metal case.

Such angular flexure, regarded in axial section, of the lip permits a greater adaptability of the sealing edge to expand uniformly to suit a range of shaft diameters, although different garter springs may be required to suit different shaft diameters. Also, when the seal is running on a shaft, the greater lip flexibility improves accommodation to shaft surface imperfections and vibration.

It is possible that some improvement might be obtained by modifying any shaft lip seal to a concave moulded face meeting the sealing edge, an eventual sealing wear land, but it is not likely to be significant for seals required to be of hard material, e.g., more than 90° I.R.H. (International Rubber Hardness).

Consequently, the present invention is applied, as above-mentioned, to a seal with a lip of elastomeric material with a Young's modulus of between 3.5 and 8.5 MN/m². Examples of suitable materials are oil-resistant synthetic rubber, such as nitrile rubbers and silicone rubbers, having a hardness in the range 55° to 90° I.R.H.

One example of the form of the lip of a seal in accordance with the invention is illustrated by FIG. 4 which shows a lip as moulded and before trimming, on the line 7a or 7b for example, to form both the trim face, at the desired angle, and the sealing edge 6 at the required nominal diameter.

The axial dimension L, from the sealing edge to the junction of the leg 4 with the radial web, or equivalent part of the moulded ring, is known as the lip height and from this can be determined the appropriate curvature for the concavity of the moulded face 8 to give a required tangent angle 0.

For a circular concavity, the radius C is given by $$C = \frac{L}{\sin \phi}$$

The concavity need not be circular, although this is probably the most convenient form for the manufacture of moulding tools, and an equivalent parabola or other curve of the second degree may be used, particularly if it is desired to obtain a given gradation in thickness, and thus flexibility, of the leg 4.

The moulded face 8 need not be concave throughout but could have a concave portion meeting the sealing edge and merging into a straight frusto-conical surface within the lip height L.

Although the invention has been described as applied to an internal seal, to seal against a shaft surface, it can of course be applied to an external seal which seals against the surface of a surrounding housing.

We claim:

1. A rotary shaft lip seal comprising a moulded ring of elastomeric material with a sealing lip having a sealing edge defined on the air side by a concave moulded face, in which the elastomeric material of the ring has a Young's modulus of a value between 3.5 and 8.5 MN/m² and the concavity of the moulded face is such that it meets the sealing edge at a tangent angle of between 50° and 80° inclusive, the resultant effect of the resilient characteristics of the material having a said value of Young's modulus and the moulded face a said tangent angle being that, in use, the moulded face sharply meets and maintains defintion of a sealing wear band.

2. A seal according to claim 1, characterized thereby that the concave moulded face is a ring segment of a spherical surface so that the concavity thereof is of circular curvature.

3. A seal according to claim 2, characterized thereby that the radius of curvature (C) of the concave moulded face is given by the equation $$C = \frac{L}{\sin \phi}$$

in which L is the lip height and $\phi$ is the tangent angle.

4. A seal according to claim 3, characterized thereby that the radius of curvature (C) is between 2 mm and 7 mm inclusive.

\* \* \* \* \*